3,598,727
ARTIFICIAL KIDNEY
Charles B. Willock, 16222 SE. Oatfield Road,
Milwaukie, Oreg. 97222
Filed Apr. 7, 1969, Ser. No. 814,078
Int. Cl. B01d 31/00, 13/00
U.S. Cl. 210—22    10 Claims

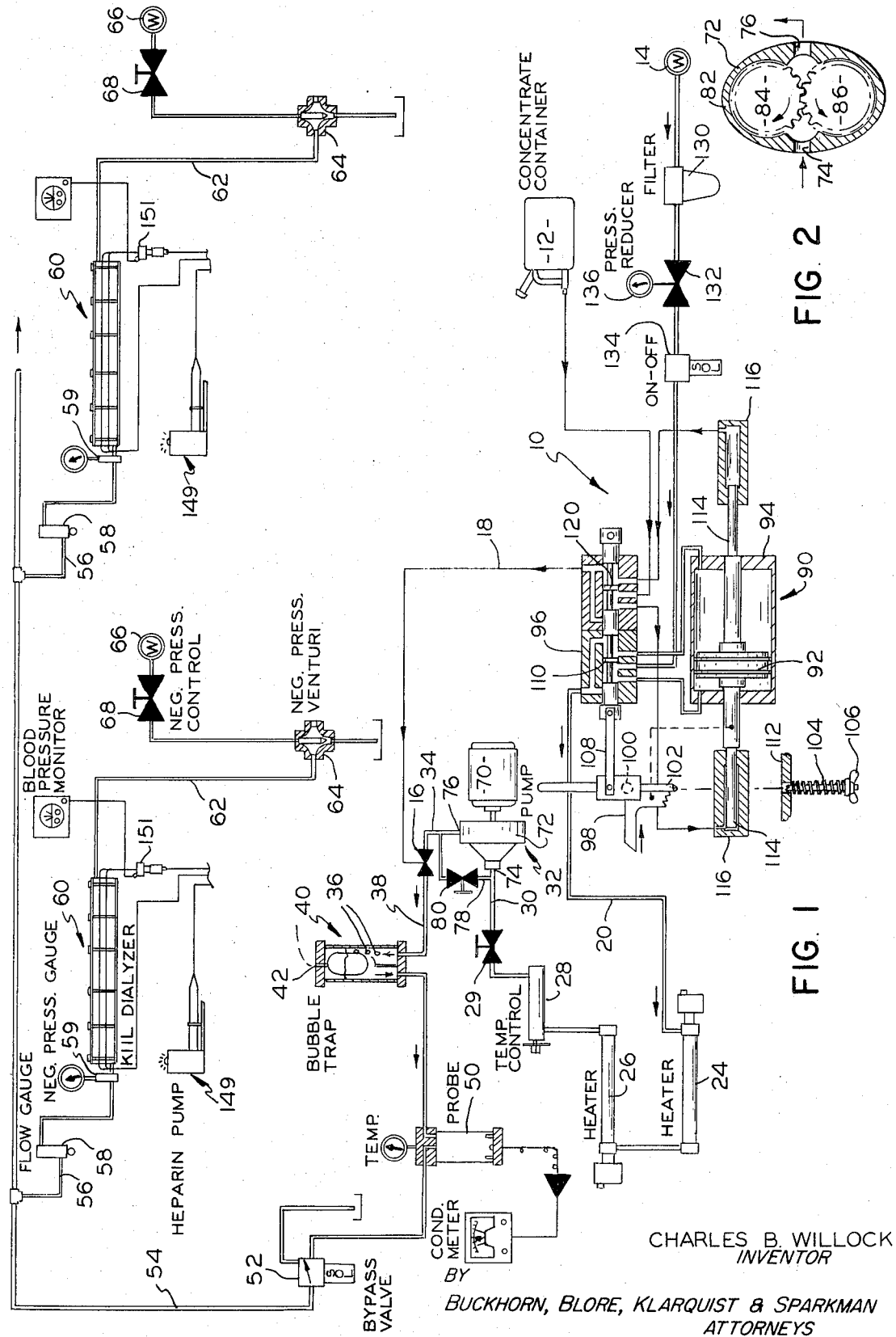

ABSTRACT OF THE DISCLOSURE

In an artificial kidney, a dialysate concentrate liquid and heated tap water are fed separately by pumps in fixed proportions to a mixing venturi where the water and liquid are combined to form a dialysate solution. In order to remove from the dialysate solution a desired portion of air which has been introduced therein from the water, the heated water is passed through a positive displacement pump having a restricted orifice bypass line before it arrives at the mixing venturi. This causes consolidation of the air from small to large bubbles which are removed by a bubble trap. The resulting deaerated solution is then advanced through a header to branch lines to dialyzers.

---

This invention relates to an artificial kidney, and more particularly to an improved artificial kidney.

In artificial kidneys utilizing Kiil dialyzers and utilizing tap water from tap water lines, a dialysate solution is used to remove wastes from the blood of the patient, after which the blood is returned to the patient and the solution is discharged as waste. It is very important to remove some air from the dialysate solution to leave a precise concentration of air so that there is substantially no interchange of air between the blood and the solution. In the prior art it has been difficult to do this.

An object of the invention is to provide a new and improved artificial kidney.

Another object of the invention is to provide improved artificial kidney dialysis.

A further object of the invention is to provide improved methods and apparatus for removing a precise portion of air from a dialysate solution.

Another object of the invention is to provide an artificial kidney driven primarily by tap water from a tap water line and adapted to be used with tap water lines having widely varying tap water pressures.

The invention provides an artificial kidney and method of dialysis in which at least one air containing component of a dialysate solution is subjected to a negative pressure to consolidate a precise fraction of the air from small bubbles to large bubbles which are then easily removed from the solution. In an artificial kidney forming a specific embodiment of the invention, tap water and a dialysate concentrate liquid are pumped separately by positive displacement pumps in a fixed proportion along separate paths to a mixing venturi, and the tap water is first heated in its path and then is passed through a reducing valve to and through a positive displacement booster pump having a recirculating, orificed bypass line, and the booster pump creates a negative pressure at its inlet, the reducing valve being near the inlet. This reduces the pressure on the water to concentrate into larger bubbles the desired fraction of the air in the water. The larger bubbles are removed after the water and the dialysate liquid concentrate have been mixed together. The solution then flows through a conductivity probe and a selectively operable bypass valve to a main line from which branch lines lead to dialyzers.

In the drawings:

FIG. 1 is a diagrammatic view of an artificial kidney forming one embodiment of the invention; and FIG. 2 is a schematic, sectional view of a pump of the artificial kidney of FIG. 1.

Referring now in detail to the drawings, there is shown therein an artificial kidney forming one embodiment of the invention which includes a proportioning device 10 which pumps a dialysate concentrate liquid from a concentrate container 12 and tap water from a tap water supply pipe 14 leading from a source of tap water under a substantially constant pressure. The dialysate concentrate liquid is fed to a mixing venturi 16 through a line 18, and the tap water is fed to the mixing venturi through a line 20, heaters 24 and 26, a temperature control 28, a manually adjustable reducing valve 29, a line 30, a negative pressure device 32 and a line 34. The negative pressure device tends to pump the heated water faster than the water is supplied from the proportioning device 10. This creates a negative pressure or partial vacuum in the water in the line 30 approaching the negative pressure device to cause a precise fraction of the air in this portion of the water to concentrate into large bubbles. This fraction of the air is maintained in the large bubbles as the water and the dialysate concentrate liquid are mixed together by the venturi 16 to form a dialysate solution. The solution is forced through a line 38 to a known, float type, deaerator 40, which causes the air bubbles 36 to escape through a vent 42 leaving finely dispersed air in the solution in a precise concentration such that there is substantially no interchange of air between the blood of the patients in the dialyses and the solution.

The solution then is forced from the deaerator 40 through a salinity detector 50 and a manually actuated, selectively operated solenoid operated bypass valve 52 to a mainline 54. The solution in the mainline travels through branch lines 56, flow gauges 58 and negative pressure gauges 59 to dialyzers 60. The dialyzers 60 have bloods of the patients circulated therethrough through lines 62 and 65 and the solution removes wastes from the bloods and is discharged as waste from the dialyzers 60 through negative pressure venturies 64 supplied with pumping water from supply pipes 66 and manually adjustable, negative pressure control valves 68.

The negative pressure device 32 includes an electric motor 70 driven at a substantially constant speed, a positive displacement, gear pump 72 having an inlet 74 and an outlet 76 and a recirculating bypass line 78 including a restrictive orifice in the form of a manually adjustable reducing valve 80. The lines 30 and 34 are of transparent material so that the water flowing therethrough can be observed and bubbles detected.

The motor 70 is operated at a speed such as to drive the pump 72 to tend to pump the water faster than the rate of flow at which the water is supplied to the pump by the proportioning device 10 through the reducing valve 29. This causes a reduction in the pressure of the water approaching the pump to increase the gathering of the air in the water into larger bubbles. The magnitude of the pressure drop at the inlet side of the pump 72 may be adjusted by adjusting the valve 29, which increases the pressure drop in accordance with the extent that the valve 29 is closed. Also, the valve 80 may be adjusted to adjust the negative pressure. Preferably, the temperature of the water being supplied to the pump 72 is slightly over 100° F. and the negative pressure is substantial, preferably between five and seven and one-half pounds per square inch, for water pressure of about ten to fifteen inches of mercury, about twenty pounds per square inch at the inlet side of the valve 29.

The gear pump 72 includes a housing 82 (FIG. 2) and spur gears 84 and 86 driving in the directions shown to draw water into the housing through the inlet 74 and discharge it through the outlet 76. The pump 72 is of the positive displacement type and is a commercially available gear pump. To keep the size of the bubbles of air from being so large as to cause cavitation in the pump 72, the valve 29 is placed close to the inlet of the pump 72, preferably being about six inches therefrom.

The proportioning device 10 (FIG. 1) includes a double-acting, positive displacement pump 90 having a piston 92 driven by the pressure of the tap water alternately in opposite directions to alternately pump the tap water from opposite ends of a cylinder 94 through a four-way valve 96 to the line 20. The valve 96 also controls the supply of the tap water alternately to opposite ends of the cylinder to drive the piston and refill each end of the cylinder. The valve 96 is alternately reversed by a snap action cam actuator 98 reciprocated by the piston 92. A follower pin 100 carried by a rod 102 is urged downwardly by a spring 104 adjustable in compression by wingnut 106 on the rod 102, and a link 108 connects the rod 102 to a spool 110 of the valve 96. The spring 104 engages a fixed abutment 112. By adjusting the compression of the spring 104, the cycles per minute can be made that desired. The piston 92 carries small pistons or rams 114 which form, with cylinders 116, positive displacement pumps to pump the dialysate concentrate liquid through a spool valve 118 to the line 18 at a flow of a fixed fraction of that of the water pumped by the pump 90, a spool 120 of the valve 118 being connected to and driven by the spool 110. The power of the pump 90 is somewhat greater than that of the pump 32 so that, for operation with the pressure of the water at the inlet of the pump 90 being about twenty pounds per square inch, the effect of the pump 32 on the speed of the pump 90 is not substantial. A heparin pump 149 and a blood detector 151 are also provided.

The tap water flows from the pipe 14 through a filter filter 130, a manually adjustable pressure reducing valve 132 and a solenoid operated, manually controlled shutoff valve 134. The valve 132 serves to keep the inlet water pressure of the pump 90 substantially constant, and has an indicating gauge 136. The valve 132 is adjusted to bring its outlet water pressure to twenty pounds per square inch where the tap water line 14 has pressure greater than twenty pounds. Where the pressure of the tap water source is less than twenty pounds per square inch, the valve 132 is almost fully open to effect only a small reduction, and, compared to operation with a higher pressure tap water source, the valve 29 is opened somewhat and the valve 80 is closed somewhat to provide the desired air removal. The above-described artificial kidney is adapted to operate precisely even with a pressure of the tap water as low as five pounds per square inch. For such a condition of operation, the valves 29 and 132 are substantially fully open and the valve 80 is substantially fully closed so that the pump 72 provides a much larger portion of the pumping force of the water and concentrate liquid. For use with a tap water source of a pressure of at least twenty pounds per square inch, the valve 80 may be a fixed orifice and the valves 29 and 132 adjusted if necessary.

The negative pressure device 32, in effect, also serves as a booster pump to aid the pump 90. This is of particular importance where the artificial kidney is used where only low pressure tap water sources are available. Adjustments of the valves 29, 80 and 132 adapt the device 32 to different pressures of tap water sources.

What is claimed is:

1. In an artificial kidney,
a tap water source for supplying tap water under a first predetermined pressure,
first pump means for receiving tap water from the tap water source and for pumping the water therefrom under a second predetermined pressure,
first adjustable reducing valve means for reducing the pressure of the water supplied to the first pump means by the source,
heater means receiving the water from the first pump means for heating the water,
second pump means receiving the water from the heater means for creating a negative pressure on the water being supplied thereto,
second adjustable reducing valve means positioned between the heater means and the second pump means for restricting the flow of water from the heater means to the second pump means,
a mixing valve receiving the water from the second pump means,
means for supplying a dialysate concentrate liquid to the mixing valve to form a solution with the water,
and deaerating means positioned for removing air from the solution.

2. The method of dialysis comprising:
pumping tap water containing excess dissolved air along a first path and a dialysate concentrate liquid along a second path toward a mixing valve to form a solution,
restricting the flow of the water toward the mixing valve at a predetermined point in the first path,
creating a predetermined negative pressure on the water at a point between the mixing valve and said predetermined point to form entrained bubbles from dissolved gases,
removing the at least part of said entrained bubbles from the solution,
and reducing said negative pressure prior to the water reaching said mixing valve.

3. The method of dialysis comprising pumping water containing excess dissolved air and a dialysate concentrate liquid toward a liquid mixing means along, respectively, a first path and a second path,
supplying water to the pump from a predetermined source through an adjustable reducing orifice,
restricting the flow of water at a first point in the first path,
positively pumping the water at a second point in the first path located between the first point and the mixing means to create a negative pressure on the water, so that at least a part of the dissolved gases concentrate to form bubbles,
reducing the negative pressure on the water while leaving the bubbles entrained,
and removing at least a substantial portion of the entrained bubbles at a point subsequent to the second point.

4. In an artificial kidney,
a mixing means,
pump means for pumping tap water containing excess dissolved air along a first path and a dialysate concentrate liquid along a second path toward said mixing means to form a solution,
restriction means for restricting the flow of water toward the mixing means at a predetermined point in said first path,
means for creating a negative pressure on the water at a point between said mixing means and said predetermined point to form entrained bubbles from dissolved air,
means for removing at least part of said bubbles from the solution,
and means for reducing said negative pressure prior to the water reaching said mixing means.

5. In an artificial kidney,
mixing means,
pump means for pumping tap water containing excess dissolved air along a first path and a dialysate concentrate liquid along a second path toward said mixing means to form a solution,
restriction means upstream of said pump means for restricting the flow of water toward said pump means so as to create negative pressure on the water so as to concentrate at least part of the dissolved air into bubbles, means for elimination of at least part of said negative pressure prior to the water reaching said mixing means, means for removing at least part of the bubbles from said water, and means for conducting a solution of concentrate and partially deaerated water to a dialyzer.

6. In an artificial kidney, a dialyzer, means defining a liquid flow path leading to said dialyzer, deaerating means in said flow path upstream of said dialyzer for removing excess air from a liquid flowing therealong toward said said dialyzer, pump means upstream of said deaerating means for pumping liquid along said flow path toward said dialyzer, flow-restricting means in said flow path for restricting the flow of liquid to the pump means to cause the pump means to apply a negative pressure to the portion of said liquid immediately upstream of said pump means to form bubbles of excess air in said liquid portion, said pump means acting to pump said bubble-containing liquid toward said deaerating means while reducing the negative pressure thereof on the downstream side of said pump means and upstream of said deaerating means.

7. Apparatus according to claim 6 including means downstream of said dialyzer for applying a second negative pressure to said liquid as it passes through said dialyzer, said second negative pressure being less than the first-mentioned negative pressure created by said pump means.

8. Apparatus according to claim 6 including means upstream of said pump means for heating the liquid flowing to said pump means.

9. Apparatus according to claim 6 wherein said pump means is a positive displacement pump and includes a recirculating bypass line connecting the inlet and outlet of said pump and a restrictive orifice in said bypass line.

10. The method of preparing a dialysate liquid comprising:

pumping liquid for use in dialysis and containing excess dissolved air along a flow path toward a dialyzer, applying the pumping action to pump the liquid at a point in the flow path upstream of the dialyzer, restricting the flow of liquid in said flow path at such a point upstream of the point of application of said pumping action as to create a negative pressure on the liquid to cause at least part of the dissolved air to consolidate into bubbles, at a point in the flow path upstream from the dialyzer eliminating at least part of the negative pressure on said liquid while leaving the bubbles entrained therein, removing from the liquid at least a portion of the entrained bubbles at a point in the flow path upstream from the dialyzer, and thereafter conducting the partially deaerated liquid to the dialyzer.

References Cited

UNITED STATES PATENTS

| | | | |
|---|---|---|---|
| 3,352,779 | 11/1967 | Austin et al. | 210—16X |
| 3,406,826 | 10/1968 | Willock | 210—181X |
| 3,441,136 | 4/1969 | Serfass et al. | 210—321X |

OTHER REFERENCES

Eschbach, et al., "Unattended Overnight Home Hemodialysis," from Transactions American Society, Artificial Internal Organs, vol. XII, pp. 346–356 relied on, published June 10, 1966.

FRANK A. SPEAR, JR., Primary Examiner

U.S. Cl. X.R.

210—181, 188, 321, 416